United States Patent Office 2,925,447
Patented Feb. 16, 1960

2,925,447

ALKYLATION OF SATURATED HYDROCARBONS

Herbert R. Appell, North Riverside, Ill., assignor, by mesne assignments, to Universal Oil Products Company, Des Plaines, Ill., a corporation of Delaware No Drawing. Application December 30, 1957
Serial No. 705,741

17 Claims. (Cl. 260—666)

This invention relates to a process for the alkylation of saturated hydrocarbons in the presence of a novel catalyst. More particularly, this invention relates to the alkylation of an alkylatable saturated hydrocarbon with an olefin-acting compound at alkylation conditions in the presence of an alkylation catalyst comprising a mixture of a Friedel-Crafts metal halide and aluminum plated with a metal selected from the group consisting of iron, cobalt, nickel, and tin.

An object of this invention is to produce alkylated saturated hydrocarbons and particularly to produce isoparaffin hydrocarbons. A specific object of this invention is to produce substantially saturated gasoline boiling range hydrocarbons having high antiknock values which may be utilized as such or as components of gasoline suitable for use in airplane or automobile engines. Numerous catalysts have been proposed for the alkylation of paraffin hydrocarbons with olefin-acting compounds including liquid catalysts such as sulfuric acid, hydrogen fluoride, etc. Similarly, solid catalysts such as aluminum chloride, aluminum bromide, metal oxides, metal sulfides, and clays have been proposed as catalysts for this reaction. Each of these prior art catalysts suffers from at least one inherent disadvantage and it is a further object of this invention to provide an alkylation catalyst which overcomes each and all of such disadvantages. For example, the prior art teaches that the above mentioned liquid catalysts are not satisfactory alkylation catalysts for the reaction of isobutane with ethylene. Sulfuric acid is not a satisfactory catalyst for the alkylation of isobutane with propylene. In addition, sulfuric acid has the inherent disadvantage that rapid deterioration of the catalyst takes place during use. Large amounts of sludge formation, an undesirable side reaction, occur when aluminum chloride alone is used as the catalyst for the alkylation reaction. Metal oxides, clays, etc., which are stable solid catalysts can only be utilized at high temperatures and high pressures. The use of the novel catalyst of the present invention overcomes these and other disadvantages which are well known to one skilled in the art.

One embodiment of the present invention relates to a process for the alkylation of an alkylatable saturated hydrocarbon with an olefin-acting compound at alkylation conditions in the presence of a catalyst comprising a mixture of a Friedel-Crafts metal halide and aluminum plated with a metal selected from the group consisting of iron, cobalt, nickel, and tin.

Another embodiment of the present invention relates to a process for the alkylation of an alkylatable paraffin hydrocarbon with an olefin-acting compound at alkylation conditions in the presence of a catalyst comprising a mixture of a Friedel-Crafts metal halide and aluminum plated with a metal selected from the group consisting of iron, cobalt, nickel, and tin.

A further embodiment of the present invention relates to a process for the alkylation of an alkylatable cycloparaffin hydrocarbon with an olefin-acting compound at alkylation conditions in the presence of a catalyst comprising a mixture of a Friedel-Crafts metal halide and aluminum plated with a metal selected from the group consisting of iron, cobalt, nickel, and tin.

A still further embodiment of this invention relates to a process for the alkylation of an isoparaffin with an olefin at alkylation conditions in the presence of a catalyst comprising a mixture of a Friedel-Crafts metal halide and aluminum plated with a metal selected from the group consisting of iron, cobalt, nickel, and tin.

A specific embodiment of the present invention relates to a process for the alkylation of isobutane with ethylene at alkylation conditions in the presence of a catalyst comprising a mixture of aluminum chloride and nickel-plated aluminum.

Another specific embodiment of the present invention relates to a process for the alkylation of isobutane with propylene at alkylation conditions in the presence of a catalyst comprising a mixture of aluminum chloride and nickel-plated aluminum.

A still further specific embodiment of the present invention relates to a process for the alkylation of isobutane with a butene at alkylation conditions in the presence of a catalyst comprising a mixture of aluminum chloride and nickel-plated aluminum.

An additional specific embodiment of the present invention relates to a process for the alkylation of methylcyclohexane with propylene at alkylation conditions in the presence of a catalyst comprising a mixture of aluminum chloride and nickel-plated aluminum.

Other embodiments of the present invention will become apparent in considering the specification as hereinafter set forth.

I have found that a catalyst composition useful for the alkylation of saturated hydrocarbons reaction may be prepared by commingling a Friedel-Crafts metal halide and aluminum plated with a metal selected from the group consisting of iron, cobalt, nickel, and tin. While the catalyst of the present invention includes a Friedel-Crafts metal halide, the catalyst possesses properties superior to those of a Friedel-Crafts metal halide alone. These superior properties which result from a simple mixture of a Friedel-Crafts metal halide and aluminum plated with a metal selected from the group consisting of iron, cobalt, nickel, and tin are indeed surprising. While it is obvious that the catalyst composition of the present invention is not a chemical reaction product of a Friedel-Crafts metal halide and aluminum plated with a metal selected from the group consisting of iron, cobalt, nickel, and tin, it is not known whether or not the Friedel-Crafts metal halide is simply physically mixed with or adsorbed on the plated aluminum. It is felt that the latter state is more probably correct. As will be illustrated in the examples appended to the present specification, the catalyst of the present invention gives results different than are obtained by the use of a Friedel-Crafts metal halide alone, but under conditions of temperature, pressure, space velocity or space time, etc., ordinarily used for a Friedel-Crafts metal halide. For example, sludge formation which is a serious detriment to the commercial utilization of a Friedel-Crafts metal halide as a catalyst for the alkylation of saturated hydrocarbons reaction is minimized or negligible or for all practical purposes eliminated by use of the mixed catalyst composition of the present invention. Furthermore, aluminum plated with a metal selected from the group consisting of iron, cobalt, nickel, and tin is ordinarily considered to have little or no catalytic activity in the alkylation of saturated hydrocarbons reaction under conditions employed for Friedel-Crafts metal halide catalysts. Thus, a nickel-plated aluminum comprising about 96% by weight of aluminum and about 4% by weight of nickel has little or no catalytic activity for the alkylation of isobutane with ethylene, propylene, or a butene under the conditions normally utilized for such alkylation using aluminum chloride as the catalyst. It is therefore surprising that aluminum plated with a metal selected from the group consisting of iron, nickel, cobalt, and tin enhances the catalytic properties of a Friedel-Crafts metal halide under conditions ordinarily utilized for Friedel-Crafts metal halide catalysts alone because such plated aluminum itself exhibits substantially little or no catalytic activity at such conditions for said reaction. Furthermore, it has been suggested in the prior art to utilize certain porous materials as supports for Friedel-Crafts metal halides. Such porous supports all have relatively high surface areas and include alumina, clays, various naturally occurring silica-aluminas, kieselguhr, etc. While Friedel-Crafts metal halides such as aluminum chloride can be supported on these porous materials with the resultant production of solid supported metal halide catalysts, these resultant catalysts have an unfortunate inherent disadvantage since these supports tend to adsorb sludge formed in the reaction. Thus, they have very short lives in use. Not only does this adsorption of sludge lead to catalyst deactivation but it also apparently accelerates the formation of additional sludge. The catalyst compositions of the present invention do not suffer from this disadvantage and therefore are extremely desirable for use in continuous processes operating for long periods of time.

As hereinbefore set forth, the novel catalyst for the alkylation of saturated hydrocarbons reaction comprises a mixture of a Friedel-Crafts metal halide and aluminum plated with a metal selected from the group consisting of iron, cobalt, nickel, and tin. The Friedel-Crafts metal halide preferably comprises aluminum chloride. Other Friedel-Crafts metal halides utilizable as catalyst components within the scope of the present invention are aluminum bromide, zinc chloride, zirconium chloride, gallium chloride, titanium tetrachloride, ferric chloride, ferric bromide, antimony chloride, antimony bromide, bismuth chloride, and others which are well known to one skilled in the art.

As set forth hereinabove, the Friedel-Crafts metal halide is utilized in admixture with aluminum plated with a metal selected from the group consisting of iron, cobalt, nickel, and tin in the alkylation process of the present invention. The aluminum which is thus plated may be selected from various physical forms and shapes including aluminum powder, aluminum pellets, aluminum chunks, aluminum moss, etc., the only restriction being that the size of the aluminum particles be such that a suitable surface is available for plating of the desired metal thereon and that the thus plated aluminum particles can be conveniently utilized as a bed in a fixed bed type catalytic reactor. The aluminum need not be chemically pure but may contain varying small quantities of impurities such as occur in commercial grades of aluminum. However, if so desired, very pure forms of aluminum may be utilized such as those available as 99.99% aluminum and 99.999% aluminum. The metal plating of the aluminum with a metal selected from the group consisting of iron, cobalt, nickel, and tin may be carried out in various manners. For example, the metal may be plated on the aluminum by electroplating, by electrochemical reduction of a metal solution into which aluminum particles are placed, by chemical reduction of the metal on the aluminum such as by hypophosphite ion, by dipping of aluminum particles into a molten bed of the selected metal, by spraying the selected metal onto the aluminum, by pilling of the selected metal with the aluminum, by sublimation of the selected metal onto aluminum in a vacuum or in an atmosphere of an inert gas such as from a hot nickel wire, or by decomposition of a metal carbonyl or other volatile metal compound on an aluminum surface such as the decomposition of nickel carbonyl on aluminum, etc. In the plating of aluminum with a metal selected from the group consisting of iron, cobalt, nickel, and tin, from about 1 to about 40% by weight of the metal may be plated on the aluminum. It has been found that very satisfactory results are obtained when the quantity of metal plated on the aluminum is within the range of from about 2 to about 15% by weight of the aluminum.

The mixture of Friedel-Crafts metal halide and aluminum plated with a metal selected from the group consisting of iron, cobalt, nickel, and tin may be formed in any suitable manner. In one method, aluminum chloride and nickel-plated aluminum are physically mixed by grinding together in a mortar or with a ball mill or other type grinding apparatus. In another method, particles of aluminum chloride and tin-plated aluminum are merely physically commingled. In addition, it may be desirable to form a catalyst bed or zone as a fixed bed for a process of the continuous type, in which catalyst bed or zone the Friedel-Crafts metal halide and the plated aluminum are placed in alternating layers. In some cases, the Friedel-Crafts metal halide may vaporize or sublime at relatively low temperatures and in such instances the requisite amount of Friedel-Crafts metal halide may be vaporized or sublimed onto the aluminum plated with a metal selected from the group consisting of iron, cobalt, nickel, and tin to form a solid catalytic mass. A further method comprises continuous addition of the Friedel-Crafts metal halide, for example dissolved in a stream of one or more of the reactants, such as aluminum chloride dissolved in isobutane, to a reactor containing a fixed bed of plated aluminum which may or may not have previously had Friedel-Crafts metal halide admixed therewith or sublimed thereon.

The preferred catalyst mixtures which are granular solids at ordinary temperatures are preferably utilized as such, but in some cases it may be desirable to utilize such mixtures with carrying or spacing materials of relatively inert character such as the various prepared forms of aluminum oxide, various silicas, activated carbon or char, silicate minerals, synthetic silica-alumina type composites, and acid-treated kaolin group minerals such as, for example, the acid-treated montmorillonites of commerce some of which are known as "Filtrol," "Tonsil," etc. The preferred catalytic composites may also be prepared in the presence of these carriers or spacing materials in a relatively finely divided condition so that an intimate mixture of catalyst and carrier or spacing material is produced, or they may be prepared separately and used to surface prepared granules, or mixed with finely divided carriers and formed into particles or pellets by extrusion procedures.

In contrast to Friedel-Crafts metal halides, the catalysts of the present invention do not form substantial amounts of complexes with unsaturated hydrocarbons and, accordingly, they may be used in continuous processes over long periods of time with relatively little contamination by such complexes so that in most instances the catalyst life is considerably longer than the life of the corresponding Friedel-Crafts metal halide in similar types of hydrocarbon conversion reactions.

As hereinbefore set forth, the novel catalyst for the alkylation of saturated hydrocarbons reaction of the present invention comprises a mixture of a Friedel-Crafts metal halide and aluminum plated with a metal selected from the group consisting of iron, cobalt, nickel, and tin. The proportions of metal-plated aluminum and Friedel-Crafts metal halide may vary over a relatively wide range. Thus, from about 1% to about 50% by weight of a Friedel-Crafts metal halide based on the weight of metal-plated aluminum is utilized. Excellent results have been obtained by the utilization of from about 10% to about 30% by weight of Friedel-Crafts metal halide, for example, aluminum chloride, based on the weight of a nickel-plated aluminum containing from about 2% to about 15% nickel.

As hereinabove set forth, the present invention relates to a process for the alkylation of an alkylatable saturated hydrocarbon with an olefin-acting compound at alkylating conditions in the presence of a catalyst comprising a mixture of a Friedel-Crafts metal halide and aluminum plated with a metal selected from the group consisting of iron, cobalt, nickel, and tin. Many saturated hydrocarbons are utilizable as starting materials in this process. Preferred saturated hydrocarbons are isoparaffins and naphthenic hydrocarbons containing one or more alkyl groups. Suitable paraffin hydrocarbons include isobutane, isopentane, 2-methylpentane, 3-methylpentane, 2,3-dimethylbutane, 2-methylhexane, 3-methylhexane, 2-methylheptane, 3-methylheptane, etc., and other isoparaffins containing at least one tertiary carbon atom per molecule. Cycloparaffin hydrocarbons suitable as starting materials include methylcyclopentane, methylcyclohexane, etc.

Isobutane is the isoparaffin commonly subjected to alkylation commercially, although higher molecular weight isoparaffins also react with olefin-acting compounds under similar or modified conditions of operation to produce branched chain paraffinic hydrocarbons other than the isoparaffinic hydrocarbons charged to the process. However, as the higher molecular weight isoparaffins such as isopentane, isohexane, etc., are themselves valuable constituents of high antiknock gasoline, they are consequently less commonly used than isobutane as charge stocks for the alkylation process. Of the various naphthenic hydrocarbons which may be alkylated in the presence of the catalyst described herein to produce naphthenic hydrocarbons of more highly branched chain structure, methylcyclopentane and its alkyl derivatives are commonly employed in such alkylation; however, cyclopentane and cyclohexane and alkyl derivatives of cyclohexane containing at least one tertiary carbon atom per molecule may be utilized to advantage. The resulting alkylates are utilizable as such or as components for high antiknock gasoline. In the alkylation reaction, normal paraffins such as normal butane, normal pentane, normal hexane, normal heptane, etc., are utilizable to varying extents depending upon the degree of isomerization of the normal paraffinic hydrocarbon prior to the alkylation reaction. Since the catalyst of the present invention is extremely active, such combination isomerization-alkylation reactions are not surprising and are thus within the generally broad scope of this invention.

Suitable alkylating agents which may be charged in this process are olefin-acting compounds including monoolefins, diolefins, polyolefins, also alcohols, ethers, esters, the latter including alkyl halides, alkyl phosphates, certain alkyl sulfates, and also esters of various carboxylic acids. The preferred olefin-acting compounds are olefinic hydrocarbons or olefins comprising monoolefins having one double bond per molecule and polyolefins which have more than one double bond per molecule. Monoolefins which may be utilized for alkylating paraffin hydrocarbons in the presence of the hereinabove described catalyst are either normally gaseous or normally liquid and include ethylene, propylene, 1-butene, 2-butene, isobutylene, pentenes, and higher molecular weight normally liquid olefins, the latter including various olefin polymers having from about 6 to about 18 carbon atoms per molecule. Cycloolefins such as cyclohexene, cyclopentene, and various alkylcycloolefins may also be utilized but generally not under the same conditions of operation applying to the cyclic olefins. The polyolefinic hydrocarbons utilizable in the process of the present invention include conjugated diolefins such as butadiene and isoprene, as well as non-conjugated diolefins and other polyolefinic hydrocarbons containing more than two double bonds per molecule.

Alkylation of the above described alkylatable saturated hydrocarbons may also be effected in the presence of the hereinabove referred to catalyst by reacting saturated hydrocarbons with certain substances capable of producing olefinic hydrocarbons under the conditions of operation chosen for the process. Such olefin producing substances include alkyl halides capable of undergoing dehydrohalogenation to form olefinic hydrocarbons containing at least 2 carbon atoms per molecule. The alkyl halides comprise a particularly desirable group of compounds which act as olefins in admixture with alkylatable paraffin hydrocarbons and the catalyst of the present invention, since in the reaction hydrogen halide is produced. Such hydrogen halide is often a desirable component in the process of the present invention, and in some cases is added directly. Also, in other cases, it is desirable to utilize mixtures of the above described olefin-acting compounds and alkyl halides. A specific example of such a mixture is propylene and isopropyl chloride, and a butene and sec-butyl chloride or tert-butyl chloride. In such a case, olefinic hydrocarbons and the above mentioned olefin producing substances are herein referred to as olefin-acting compounds.

In accordance with the process of the present invention, the alkylation of saturated hydrocarbons reaction to produce hydrocarbons of more highly branched chain structure and of higher molecular weight than the hydrocarbons charged to the process is effected in the presence of the above indicated catalyst at a temperature of from about −30° C. to about 125° C. or higher, and preferably from about 0° C. to about 75° C., although the exact temperature needed for a particular alkylation reaction will depend upon the specific reactants employed and upon the specific catalyst utilized as well as the respective quantities thereof.

The alkylation reaction is usually carried out at a pressure of from about substantially atmospheric to about approximately 100 atmospheres and preferably under sufficient pressure to maintain the reactants and products in substantially liquid phase. In the hydrocarbon mixture subjected to alkylation, it is preferable to have present about 2 to about 10 or more, sometimes up to 20, and sometimes even up to 100 or more, molecular proportions of alkylatable saturated hydrocarbon for one molecular proportion of olefin-acting compound introduced thereto, particularly olefin hydrocarbon. Higher molecular ratios of alkylatable saturated hydrocarbon to olefin are specially desirable when the process is employed for the alkylation of a high molecular weight olefin boiling generally higher than pentenes, since these olefins frequently undergo depolymerization prior to or substantially simultaneously with alkylation so that one molecular proportion of such an olefin can thus alkylate two or more molecular proportions of alkylatable saturated hydrocarbon. The higher molecular ratios of alkylatable saturated hydrocarbon to olefin also tend to reduce polymerization of the olefin (particularly low molecular weight olefins) and tend to reduce the formation of polyalkylated products because of the operation of the law of mass action. In some cases, it may be desirable to maintain or employ an atmosphere of hydrogen within the reaction zone, or in some cases it may be desirable to maintain or employ an atmosphere of nitrogen or other inert gas.

In converting saturated hydrocarbons to effect the alkylation thereof with the type of catalysts hereinabove described, either batch or continuous operations may be employed. The actual operation of the process admits of some modification depending upon the normal phase of the reacting constituents and whether batch or continuous operations are employed.

In a simple type of batch operation, a paraffin hydrocarbon to be alkylated, such as, for example, isobutane, is brought to a temperature within the approximate range specified in the presence of a catalyst comprising a mixture of a Friedel-Crafts metal halide and aluminum plated with a metal selected from the group consisting of iron, cobalt, nickel, and tin having a concentration corresponding to a sufficient high activity, and alkylation is effected by the gradual introduction under pressure of an olefin, such as 2-butene, in a manner to attain contact between catalyst and reactant compounds.

In another method of operation, the saturated hydrocarbon may be mixed with an olefin at a suitable temperature, the catalyst comprising a mixture of aluminum plated with a metal selected from the group consisting of iron, cobalt, nickel, and tin such as nickel-plated aluminum and a Friedel-Crafts metal halide such as aluminum chloride is added and the reaction of alkylation is induced by sufficiently long contact with the catalyst. Alkylation may be allowed to progress to different stages depending upon contact time. In the case of alkylation of isobutane with normally gaseous olefins, the best results from the standpoint of motor fuel production usually are produced by the condensation of equimolar quantities of paraffin hydrocarbons and olefins. After a batch treatment, the hydrocarbons are separated from the catalyst in any suitable manner such as by decantation or quenching with water and the hydrocarbon fraction or layer is then subjected to fractionation for the recovery of an intermediate boiling range hydrocarbon fraction utilizable as motor fuel.

In one type of continuous operation, a liquid isoparaffin may be pumped through a reactor containing the mixed catalyst per se or further commingled with a suitable support. The olefin-acting compound may be added to the isoparaffin stream just prior to contact of this stream with the solid catalyst bed, or it may be introduced in multistages at various points in the catalyst bed. It is also within the scope of the present invention to add a hydrogen halide such as hydrogen chloride or hydrogen bromide or an alkyl halide to the process of the present invention, the addition being carried out either continuously or intermittently. In such an operation, the original paraffin hydrocarbon stream such as isobutane may contain sufficient dissolved hydrogen chloride to induce the desired catalytic activity of the mixture comprising aluminum chloride and nickel-plated aluminum and after this desired catalytic activity has been induced in situ, the paraffin hydrocarbon stream can be utilized without prior contacting or combination with hydrogen chloride. As stated hereinabove, instead of hydrogen chloride, an alkyl halide such as isopropyl chloride, which undergoes dehydrohalogenation under the conditions of the reaction may be utilized. The details of continuous processes of this general character are familiar to those skilled in refinery operations and any necessary additions to or modifications from the above description will be more or less obvious and can be made without departing from the generally broad scope of this invention.

The process of the present invention is illustrated by the following examples which are introduced solely for the purpose of illustration and with no intention of unduly limiting the generally broad scope of this invention.

EXAMPLE I

Several experiments were carried out to illustrate the operability of a catalyst comprising a mixture of aluminum chloride and aluminum plated with a metal selected from the group consisting of iron, cobalt, nickel, and tin. These experiments were carried out in a once-through bench scale pilot plant in which the reactor was maintained at a pressure of 300 p.s.i.g. to insure liquid phase operation. These catalysts were tested for the alkylation of isobutane with 2-butene at hourly liquid space velocities over the catalyst of from about 4 to about 8 utilizing an 8:1 mol ratio blend of isobutane to 2-butene. The tests were carried out with an air-cooled reactor in which the catalyst was started up at room temperature. As alkylation took place, the temperatures in the catalyst bed were measured by means of a thermocouple. The reaction chamber for these tests was 10 inches long and ⅞ inch in diameter. In these tests an attempt was made to evaluate two different variables or concepts. It is known by those skilled in the art that aluminum chloride itself is an active catalyst for these reactions. However, aluminum chloride in tests of this nature is overactive since high temperatures are attained rapidly and the aluminum chloride then deactivates as can be shown by a rapid decrease in peak temperature. Therefore, the catalysts evaluated, to be more satisfactory than aluminum chloride, do not necessarily have to attain the same kind of peak temperatures. As a matter of fact, the catalysts of the present invention are less active than aluminum chloride alone, but this activity is constant in contrast to aluminum chloride which loses its activity almost from the start. The variables utilized in these experiments and some of the results obtained are presented in the following Table I:

Table I

ALKYLATION OF ISOBUTANE WITH 2-BUTENE IN THE PRESENCE OF ALUMINUM CHLORIDE AND ALUMINUM PLATED WITH NICKEL, ALUMINUM PLATED WITH COBALT, AND ALUMINUM PLATED WITH TIN

| Run No. | 1 | 2 | 3 |
|---|---|---|---|
| Catalyst, gms. | 56.5 | 56.9 | 29 |
| Catalyst, AlCl$_3$ plus | Ni-Al | Co-Al | Sn-Al |
| Initial Charge: Isobutane, cc. | 300 | 300 | 280 |
| Charge Stock: | | | |
| Isobutane-Butene-2, LHSV | 4 | 4 | 8 |
| Isobutane-Butene-2, Total cc. | 800 | 800 | 1,600 |
| Isobutane-Butene-2, Duration, hrs. | 2 | 2 | 2 |
| Temperature, Initial, °C. | 22 | 23 | 28 |
| Temperature, Maximum, °C. | 45 | 46 | 73 |
| Temperature, −ΔT°C. | 0 | 0 | 0 |
| Products Recovered, Wt. Percent: | | | |
| Condensable Gas | 93.0 | 92.4 | 86.0 |
| C$_5$–216° C. | 5.1 | 5.7 | 4.9 |
| Bottoms | 1.9 | 1.9 | 9.1 |
| Wt. Percent Olefin Reacted | 80 | 83 | 84 |
| Distribution of C$_5$–216° C., Fraction, Vol. Percent: | | | |
| IBP–216° C. | 81.3 | 80.3 | 40.7 |
| Bottoms | 18.7 | 19.7 | 59.3 |
| Wt. Percent Yield: C$_5$+Liquid Product/Butene-2 Charged | 94 | 100 | 114 |
| C$_4$−, Wt. Percent Analysis: | | | |
| C$_3$H$_8$ | 0.6 | 0.5 | 0.5 |
| i-C$_4$H$_{10}$ | 96.1 | 96.4 | 94.5 |
| n-C$_4$H$_{10}$ | 1.7 | 1.7 | 2.8 |
| C$_4$H$_8$ | 1.6 | 1.4 | 2.2 |
| Bromine No., Recovered Liquid Prod. | 49 | 73 | |

*Run 1.*—The catalyst utilized for this experiment was prepared by adding 100 milliliters of 20–30 mesh aluminum to a solution containing 9.6 grams of nickel chloride, 3 grams of citric acid, 5 grams of sodium hypophosphite and enough sodium hydroxide to bring the pH to within the range of from about 5.8 to about 6.0. The solution was heated to about 70° C., the nickel was plated out and the solid was then washed, dried and treated with 10 grams of aluminum chloride. The aluminum chloride treating of the nickel-plated aluminum was carried out by weighing the 10 grams of aluminum chloride into a 125 ml. flask and then adding the nickel-plated aluminum. A stopper containing a glass tube full of drying agent was then inserted into the flask to maintain a dry atmosphere. The flask was placed on a hot plate at a surface temperature of 425° F., and as the aluminum chloride sublimed, a microburner was utilized to warm the sides of the flask so that the aluminum chloride did not deposit on the vessel wall. When the sublimation appeared complete, the flask was allowed to cool, the contents were mixed by swirling and then heated again in order to insure uniformity. The catalyst at this point contained about 5% nickel.

This run illustrates that a composite comprising a mixture of aluminum chloride with nickel-plated aluminum is a catalyst for the alkylation of isobutane with 2-butene. During the two hour run, a yield of 94% by weight of C$_5$+ liquid was obtained based on the 2-butene charged. Approximately 80% of the 2-butene charged reacted. Examination of the temperature levels shows that the temperature in the reaction zone rose from an initial of 22° C. to a maximum of 45° C. and that this maximum was maintained over the two hour run period without a temperature drop. This stable temperature is an indication that the operation is substantially sludge free.

Run 2.—The catalyst utilized for this run was prepared by adding 100 milliliters of 20–30 mesh aluminum to 300 milliliters of a solution containing 10 grams of cobaltous acetate, 15 grams of ammonium chloride, 12 grams of citric acid, 15 grams of sodium hypophosphite and enough ammonium hydroxide to bring the pH to within the range of from about 9 to about 10. The

EXAMPLE II

This example is introduced for the purpose of illustrating that wide variations in nickel content in the nickel-plated aluminum have little or no effect upon the catalyst system. In this example the nickel content of the nickel-plated aluminum is varied from about 1% by weight to about 20% by weight. These experiments were carried out in substantially the same manner as described hereinabove in Example I. The variables utilized in these experiments and some of the results obtained are presented in the following Table II:

*Table II*

ALKYLATION OF ISOBUTANE WITH 2-BUTENE IN THE PRESENCE OF ALUMINUM CHLORIDE AND NICKEL-PLATED ALUMINUM

| Run No | 4 | 5 | 6 | 7 | 8 | 9 | 10 | 11 | 12 |
|---|---|---|---|---|---|---|---|---|---|
| Catalyst, gms | 55.1 | 53.4 | 55.6 | 34.3 | 56.5 | 53.1 | 29 | 57.5 | 32 |
| Catalyst, AlCl$_3$+ | Ni-Al | Ni-Al | Ni-Al | Ni-Al | Ni-Al | Ni-Al | Ni-Al | Ni-Al | Ni-Al |
| Percent Ni | 1.0 | 1.8 | 2.0 | 4.0 | 5.0 | 5.8 | 6.0 | 10.0 | 20.0 |
| Initial Charge: Isobutane, cc | 300 | 280 | 300 | 290 | 300 | 300 | 290 | 300 | 280 |
| Charge Stock: | | | | | | | | | |
| Isobutane-Butene-2, LHSV | 4 | 4 | 4 | 8 | 4 | 4 | 8 | 4 | 8 |
| Isobutane-Butene-2, Total cc | 800 | 800 | 800 | 1,400 | 800 | 800 | 800 | 800 | 1,600 |
| Isobutane-Butene-2, Duration, Hrs | 2 | 2 | 2 | 1.75 | 2 | 2 | 1 | 2 | 2 |
| Temperature, Initial, °C | 22 | 24 | 22 | 27 | 22 | 23 | 28 | 21 | 28 |
| Temperature, Maximum, °C | 52 | 45 | 40 | 63 | 45 | 41 | 67 | 42 | 60 |
| Temperature, −ΔT° C | 0 | 0 | 0 | 0 | 0 | 0 | 0 | 0 | 0 |
| Products Recovered, Wt. Percent: | | | | | | | | | |
| Condensable Gas | 93.2 | 93.6 | 92.9 | 92.2 | 93.0 | 94.2 | 92.5 | 93.6 | 92.5 |
| C$_5$–216° C | 5.1 | 6.4 | 7.1 | 7.8 | 5.1 | 5.8 | 7.5 | 6.4 | 7.5 |
| Bottoms | 1.7 | 0.0 | | | 1.9 | 0.0 | | | |
| Wt. Percent Olefin Reacted | 80 | 72 | | | 80 | 74 | | | |
| Distribution of C$_5$–216° C., Fraction, Vol. Percent: | | | | | | | | | |
| IBP–216° C | 79.8 | 100.0 | | | 81.3 | 100.0 | | | |
| Bottoms | 20.2 | 0.0 | | | 18.7 | 0.0 | | | |
| Wt. Percent Yield: C$_5$+Liquid Product/Butene-2 Charged | 92 | 83 | 92 | 82 | 94 | 76 | 81 | 85 | 80 |
| C$_4$−, Wt. Percent Analysis: | | | | | | | | | |
| C$_3$H$_8$ | 0.9 | | | | 0.6 | | | | |
| i-C$_4$H$_{10}$ | 95.1 | 94.5 | | | 96.1 | 95.1 | | | |
| n-C$_4$H$_{10}$ | 2.4 | 3.1 | | | 1.7 | 2.8 | | | |
| C$_4$H$_8$ | 1.6 | 2.4 | | | 1.6 | 2.1 | | | |
| Bromine No.; Recovered Liquid Product | 80 | 82 | | | 49 | 90 | | | | temperature was raised to 65–70° C., the cobalt plated out, and the cobalt-plated aluminum was then washed, dried, and treated with 10 grams of aluminum chloride. The treatment with aluminum chloride was carried out in substantially the same manner described hereinabove in relation to run 1. The catalyst contained 4.5% cobalt.

From the results shown in Table I, it is observed that alkylation of isobutane with 2-butene took place in the presence of this catalyst, the yield of C$_5$+ liquid product based upon 2-butene charged being 100 weight percent. The activity of the catalyst is seen in the increase in temperature from an initial of 24° C. to a maximum of 46° C., and maintenance of this maximum temperature throughout the two hour run without a temperature drop.

Run 3.—The catalyst utilized in this run was prepared by adding 30 grams of 20–30 mesh aluminum to a solution of 2.3 grams of stannous chloride, and 5.9 grams of citric acid in 104 milliliters of water at a pH of 3.2. The solution was cooled to 11° C. before adding the aluminum. The solution was stirred at about 11° C. until the color of the metal appeared to be nearly discharged. Ice was then added to quench the reaction. The tin-plated aluminum was then washed and dried at 110° C. In this case, 4 grams of aluminum chloride was sublimed onto 50 mol of the tin-plated aluminum in the manner described in relation to run 1.

From the results in Table I it will be observed that alkylation of isobutane with 2-butene took place in the presence of this catalyst. The yield of C$_5$+ liquid product based on 2-butene charged was 114 weight percent. The activity of the catalyst is shown from the temperature increase from an initial of 28° C. to 73° C. and maintenance of this temperature for a two hour period without a temperature drop.

Run 4.—The catalyst utilized in this run was prepared by the addition of 200 ml. of 20–30 mesh aluminum to 100 ml. of a solution containing 3–7 grams of nickel chloride, 1.5 grams of citric acid, and 4 grams of sodium hypophosphite. Enough sodium hydroxide was added to bring the pH within the range of from about 5.9 to 6.0. The solution was heated to 65–70° C. at which temperature the nickel plated out on the aluminum. The nickel-plated aluminum was washed, dried, and 100 milliliters thereof was treated with 10 grams of aluminum chloride in the manner described hereinabove for Example I. The aluminum contained about 1% nickel.

During the two hour test period a yield of 92% by weight of C$_5$+ liquid was obtained based on the 2-butene charged. The peak temperature attained was 52° C. and this maximum was maintained over the run period without decrease.

Run 5.—The catalyst for this run was prepared by first preparing 500 milliliters of a solution containing 15 grams of nickel chloride, 8 grams of citric acid, and 10 grams of sodium hypophosphite, the pH of which was adjusted to about 6 by the addition of sodium hydroxide. To this solution was added 180 grams of 20–30 mesh aluminum and the solution was heated to 70° C. with stirring. When the nickel had plated out, as indicated by the loss of color from the solution, the solid was washed, filtered, and dried. One hundred milliliters of this support was then treated with 10 grams of aluminum chloride in the manner set forth in run 1. The aluminum contained 1.8% by weight of nickel.

This run illustrates that alkylation takes place, the yield of product being 83% by weight of C$_5$+ liquid based on the 2-butene charged. A peak temperature of 48° C. was attained during the two hour run and no temperature drop was noted.

Run 6.—This catalyst was prepared by adding 100 milliliters of 20–30 mesh aluminum to a solution containing 4.2 grams of nickel sulfate, 2.5 grams of citric acid, 8 grams of sodium hypophosphite and enough sodium hydroxide to bring the pH to 5.8–6.0. The solution was heated to about 70° C., the nickel plated out, and the solid was then washed, dried, and treated with 10 grams of aluminum chloride in the manner described hereinabove in run 1. The aluminum contained about 2% nickel.

During the two hour run, a yield of 92% by weight of $C_5+$ liquid was obtained based on the 2-butene charged. Examination of the temperature levels shows that the temperature in the reaction zone rose from an initial of 22° C. to a maximum of 40° C. and that this maximum was maintained over the two hour run period.

*Run 7.*—The catalyst for this run was prepared by dissolving 32.4 grams of nickel chloride, and 20 grams of citric acid in 50 milliliters of water to form a solution having a pH of 3.5. This pH was attained by adjustment with sodium hydroxide. The solution was heated to about 85–90° C. and 192 grams of 20–30 mesh aluminum was added. The solution was stirred at this temperature until the color of the metal appeared to be discharged. Ice was added to quench the reaction, and the nickel-plated aluminum was washed with water and dried at 110° C., and heated in a muffle furnace for 4 hours at 600° C. Four grams of aluminum chloride were sublimed on 50 cc. of the nickel-plated aluminum prior to use. The amount of nickel on the aluminum was about 4%.

In contrast to previous experiments, this run was carried out at an LHSV of 8 for 1.75 hours. Due to the higher space velocity, a higher peak temperature was attained, the reaction temperature rising from an initial temperature of 27° C. to a maximum of 63° C. No temperature drop during the 1.75 hours was noted. During the run, a yield of 82% by weight of $C_5+$ liquid was obtained based on the 2-butene charged.

*Run 8.*—The preparation of the catalyst for this run and the results obtained herewith were described hereinabove as run 1. This catalyst contains about 5% by weight of nickel plated on the aluminum.

*Run 9.*—The catalyst for this run was prepared in the same manner as the catalyst for run 5 except that 750 milliliters of solution was used to treat 90 grams of aluminum. After washing and drying, 10 grams of aluminum chloride was sublimed on the nickel-plated aluminum in the manner described above. This catalyst contained about 5.8% nickel on the aluminum.

During a two hour run with this catalyst, a yield of 76% by weight of $C_5+$ liquid was obtained based on the 2-butene charged. About 75% of the 2-butene charged reacted. Examination of the temperature levels shows that the reaction zone temperature rose from an initial of 23° C. to a maximum of 41° C. and that this maximum was maintained without temperature drop over the two hour run.

*Run 10.*—The catalyst for this run was prepared by dissolving 3.4 grams of nickel chloride and 3.0 grams of citric acid with 104 milliliters of water after which the pH was adjusted to 3.5 by the addition of sodium hydroxide. The solution was heated to about 85–90° C. and 40 grams of 20–30 mesh aluminum already plated to contain 4% nickel was added. The solution was stirred at the above temperature until the color of the metal was discharged, after which ice was added to quench the reaction. The nickel-plated aluminum was then washed and dried at 110° C. It contained 6% nickel. Four grams of aluminum chloride were sublimed on 50 cc. of this nickel-plated aluminum.

The run utilizing this catalyst was carried out at 8 LHSV for a one hour period. The results show that alkylation took place, the temperature of the reaction going from an initial of 28° C. to 67° C. which maximum temperature was maintained without drop during the test. During the one hour test period an 81% by weight yield of $C_5+$ liquid was obtained based on the 2-butene charged.

*Run 11.*—The catalyst for this run was prepared in the same manner as the catalyst for runs 1 and 8 except that 23 grams of nickel sulfate, 8 grams of citric acid, and 15 grams of sodium hypophosphite were utilized. The aluminum contained about 10% nickel.

The above catalyst was utilized in a two hour run during which an 85% by weight yield of $C_5+$ liquid was obtained based on the 2-butene charged. During the run, the temperature rose from an initial of 21° C. to 42° C. which maximum temperature was maintained without decrease during the two hour run.

*Run 12.*—The catalyst for this run was prepared by dissolving 24.2 grams of nickel chloride, and 19.4 grams of citric acid in 510 milliliters of water. The pH was adjusted to 3.5 with sodium hydroxide and the solution was then heated to 85–90° C. Thirty grams of aluminum already plated with 4% nickel was added, the solution was stirred until the color of the metal discharged, and ice was added to quench the reaction. The nickel-plated aluminum was washed and dried at 110° C. Four grams of aluminum chloride were sublimed onto 50 milliliters of this nickel-plated aluminum containing 20% nickel.

This catalyst was utilized in a two hour run at 8 LHSV during which an 80% by weight yield of $C_5+$ liquid product was obtained based on 2-butene charged. The temperature in this run rose from an initial of 28° C. to a maximum of 60° C., which temperature was maintained during the test.

EXAMPLE III

This example illustrates the alkylation of isobutane with ethylene in the presence of the catalyst composition of the present invention comprising aluminum chloride and nickel-plated aluminum. In contrast to the previous experiments in which the aluminum chloride was sublimed onto the plated aluminum, the experiments in this example were carried out with a catalyst bed in which the aluminum chloride and nickel-plated aluminum were merely physically admixed. These experiments were again carried out at 300 p.s.i.g., with an air-cooled reactor started up at room temperature, and in this example at 16 liquid hourly space velocity. The variables utilized in these experiments and some of the results obtained are presented in the following Table III:

*Table III*

ALKYLATION OF ISOBUTANE WITH ETHYLENE IN THE PRESENCE OF A CATALYST COMPRISING A PHYSICAL MIXTURE OF ALUMINUM CHLORIDE AND NICKEL-PLATED ALUMINUM

| Run No. | 13 | 14 |
|---|---|---|
| Catalyst, Kind | $AlCl_3$ | $AlCl_3$ |
| Catalyst, gms. | 5.0 | 2.0 |
| Other Component | Al-Ni | Al-Ni |
| Total Wt., gms. | 49.6 | 50.0 |
| Initial Charge: Isobutane, cc | 310 | 300 |
| Charge Stock: | | |
|   Isobutane-Ethylene, LHSV | 16 | 16 |
|   Isobutane-Ethylene, Total cc | 800 | 2,400 |
|   Isobutane-Ethylene, Duration, Hrs. | ½ | 1.5 |
| Temperature: | | |
|   Initial ° C | 22 | 21 |
|   Maximum ° C | 77 | 82 |
|   −ΔT° C | 3 | 4 |
| Products Recovered, Wt. Percent: | | |
|   Condensable Gas | 91.1 | 94 |
|   $C_5$–140° C | 8.9 | 6 |
|   Bottoms | 0.0 | |
| Wt. Percent Olefin Reacted | 99+ | |
| Distribution of $C_5$–140° C. Fraction, Vol. Percent: | | |
|   IBP–65° C | 67.7 | |
|   65–140° C | 32.2 | |
| Wt. Percent Yield: $C_5+$ Liquid Product/Ethylene Charged | 234 | |
| $C_4-$, Wt. Percent, Analysis: | | |
|   $C_2H_4$ | | |
|   $C_2H_6$ | | |
|   $C_3H_6$ | | |
|   $C_3H_8$ | 0.6 | |
|   i-$C_4H_{10}$ | 96.5 | |
|   n-$C_4H_{10}$ | 2.9 | |

*Run 13.*—The nickel-plated aluminum used in this run is the same as that described hereinabove in run 5. The aluminum contained 1.8% nickel plated thereon. Along with this nickel-plated aluminum 5 grams of aluminum chloride was mixed.

Examination of the results obtained show that alkylation took place, the weight percent olefin reacted being greater than 99%. In addition, there was obtained a 234 weight percent yield of $C_5+$ liquid product based on the ethylene charged. At the high space velocity utilized the reaction chamber temperature rose from an initial of 22° C. to 77° C. and dropped off 3° C. during the processing time. This is an indication that the heat of reaction at this space velocity was not being carried away from the catalyst zone in a sufficient manner.

*Run 14.*—The nickel-plated aluminum utilized for this run was a combined lot of used nickel on aluminum catalyst components. The used nickel on aluminum was blended to uniformity, washed, dried, and blended with aluminum chloride as needed. It was felt that satisfactory nickel-plated aluminum could be obtained in this manner since the nickel concentration did not appear to be critical as shown in Example II. The nickel-plated aluminum had 2 grams of aluminum chloride combined therewith in this run.

Alkylation again took place, even at the high space velocity, indicating that extremely small quantities of aluminum chloride are effective in combination with the nickel-plated aluminum. During the run the initial temperature rose from 21° C. to a maximum of 82° C. with a 4° C. temperature drop during the processing time of 1.5 hours.

EXAMPLE IV

The runs reported in this example illustrated the alkylation of isobutane with ethylene in the presence of a catalyst comprising a mixture of aluminum chloride and nickel-plated aluminum. The nickel content of the aluminum was 3.51% by weight. These runs were carried out in an effort to determine the minimum life that could be expected from the catalyst composition of this invention. The bench scale pilot plant utilized contained an internal recycle pump set at a rate of one gallon per hour so that with the feed rate of 133 grams per hour an isoparaffin to olefin ratio of 16:1 was attained. The external ratio of isobutane to olefin was 2.5:1. The pressure utilized was 450 p.s.i.g. to maintain the reactants as much as possible in liquid phase. Catalyst temperature during the run averaged about 40° C. Some of the process variables and results obtained are presented in the following Table IV:

*Table IV*

ALKYLATION OF ISOBUTANE WITH ETHYLENE IN THE PRESENCE OF ALUMINUM CHLORIDE AND NICKEL-PLATED ALUMINUM

| Run No. | 15 | 16 | 17 | 18 |
|---|---|---|---|---|
| Period No. | 6–10 | 15–18 | 24–28 | 30–33 |
| Hours on Stream, Total | 51 | 96 | 146 | 169 |
| Operating Conditions: | | | | |
| Reaction Temperature, °C | 41 | 40 | 40 | 40 |
| Feed Rate, gms./hr | 135 | 134 | 132 | 134 |
| Total Charge, g | 3,373 | 2,670 | 3,293 | 2,411 |
| Liquid Product, g | 1,075 | 973 | 1,225 | 844 |
| Octane Number: | | | | |
| F-1 Clear | 96.4 | 97.3 | 99.0 | 100.0 |
| F-1+3 cc. TEL | 107.4 | 108.5 | 113.7 | 113.9 |
| Wt. Percent Yield: Liquid Product/Ethylene Charged | 202 | 232 | 235 | 226 |
| Debutanizer O.H., s.c.f. | 35.13 | 27.32 | 33.34 | 25.61 |
| M.S. Analysis, Mole Percent (Period) | 7 | 15 | 27 | 32 |
| $CH_4$ | | 0.3 | | |
| $C_2H_4$ | | 2.8 | 2.1 | 1.1 |
| $C_2H_6$ | 1.1 | 4.0 | 1.4 | 1.1 |
| $C_3H_8$ | 0.9 | 2.5 | 0.6 | 1.0 |
| $i\text{-}C_4H_{10}$ | 89.7 | 86.0 | 94.2 | 95.1 |
| $n\text{-}C_4H_{10}$ | 1.8 | 1.1 | 0.7 | 1.5 |
| $C_4H_8$ | | 0.2 | | |
| $C_5H_{10}$ | | 0.6 | 0.2 | |
| $i\text{-}C_5H_{12}$ | 5.8 | 2.5 | 0.7 | 0.1 |
| $n\text{-}C_5H_{12}$ | 0.5 | | | |
| $C_2H_5Cl$ | 0.2 | tr | 0.1 | 0.1 |
| Period Number | 7 | | | |
| Bromine Index | 35.4 | | | |

The 169 hours' processing time during runs 15–18 represents a catalyst life of at least 161 gallons of alkylate per pound of aluminum chloride. It should be emphasized that the catalyst was still active at the end of the run and the run was discontinued since there was little indication of loss of catalyst activity.

The active catalyst consisted of 40 grams of nickel-plated aluminum (3.5% nickel) onto which 8 grams of anhydrous aluminum chloride had been sublimed. The alkylate produced was of excellent octane number.

I claim as my invention:

1. A process for the alkylation of an alkylatable saturated hydrocarbon with an olefin-acting compound at alkylation conditions in the presence of a catalyst comprising a mixture of a Friedel-Crafts metal halide and aluminum plated with a metal selected from the group consisting of iron, cobalt, nickel, and tin.

2. A process for the alkylation of an alkylatable paraffin hydrocarbon with an olefin-acting compound at alkylation conditions in the presence of a catalyst comprising a mixture of a Friedel-Crafts metal halide and aluminum plated with a metal selected from the group consisting of iron, cobalt, nickel, and tin.

3. A process for the alkylation of an alkylatable cycloparaffin hydrocarbon with an olefin-acting compound at alkylation conditions in the presence of a catalyst comprising a mixture of a Friedel-Crafts metal halide and aluminum plated with a metal selected from the group consisting of iron, cobalt, nickel, and tin.

4. A process for the alkylation of an isoparaffin with an olefin-acting compound at alkylation conditions in the presence of a catalyst comprising a mixture of a Friedel-Crafts metal halide and aluminum plated with a metal selected from the group consisting of iron, cobalt, nickel and tin.

5. A process for the alkylation of an isoparaffin with an olefin at alkylation conditions in the presence of a catalyst comprising a mixture of a Friedel-Crafts metal halide and aluminum plated with a metal selected from the group consisting of iron, cobalt, nickel, and tin.

6. A process for the alkylation of an isoparaffin with an olefin-acting compound at alkylation conditions in the presence of a catalyst comprising a mixture of aluminum chloride and aluminum plated with a metal selected from the group consisting of iron, cobalt, nickel, and tin.

7. A process for the alkylation of an isoparaffin with an olefin at alkylation conditions in the presence of a catalyst comprising a mixture of aluminum chloride and aluminum plated with a metal selected from the group consisting of iron, cobalt, nickel, and tin.

8. A process for the alkylation of isobutane with an olefin-acting compound at alkylation conditions in the presence of a catalyst comprising a mixture of a Friedel-Crafts halide and aluminum plated with a metal selected from the group consisting of iron, cobalt, nickel, and tin.

9. A process for the alkylation of isobutane with an olefin at alkylation conditions in the presence of a catalyst comprising a mixture of a Friedel-Crafts metal halide and aluminum plated with a metal selected from the group consisting of iron, cobalt, nickel, and tin.

10. A process for the alkylation of isobutane with an olefin-acting compound at alkylation conditions in the presence of a catalyst comprising a mixture of aluminum chloride and aluminum plated with a metal selected from the group consisting of iron, cobalt, nickel, and tin.

11. A process for the alkylation of isobutane with ethylene at alkylation conditions in the presence of a catalyst comprising a mixture of a Friedel-Crafts metal halide and aluminum plated with a metal selected from the group consisting of iron, cobalt, nickel, and tin.

12. A process for the alkylation of isobutane with propylene at alkylation conditions in the presence of a catalyst comprising a mixture of a Friedel-Crafts metal halide and aluminum plated with a metal selected from the group consisting of iron, cobalt, nickel, and tin.

13. A process for the alkylation of isobutane with ethylene at alkylation conditions in the presence of a catalyst comprising a mixture of aluminum chloride and nickel-plated aluminum.

14. A process for the alkylation of isobutane with propylene at alkylation conditions in the presence of a catalyst comprising a mixture of aluminum chloride and nickel-plated aluminum.

15. A process for the alkylation of isobutane with a butene at alkylation conditions in the presence of a catalyst comprising a mixture of aluminum chloride and nickel-plated aluminum.

16. A process for the alkylation of isobutane with 1-butene at alkylation conditions in the presence of a catalyst comprising a mixture of aluminum chloride and nickel-plated aluminum.

17. A process for the alkylation of isobutane with 2-butene at alkylation conditions in the presence of a catalyst comprising a mixture of aluminum chloride and nickel-plated aluminum.

References Cited in the file of this patent

UNITED STATES PATENTS

| | | |
|---|---|---|
| 2,217,019 | Ipatieff et al. | Oct. 8, 1940 |
| 2,355,339 | Story | Aug. 8, 1944 |
| 2,406,622 | Mavity | Aug. 27, 1946 |
| 2,470,144 | Clarke | May 17, 1949 |
| 2,546,180 | Wiczer | Mar. 27, 1951 |